June 5, 1945.  A. W. OEHLER ET AL  2,377,806
HITCH DEVICE
Filed Dec. 8, 1943  2 Sheets-Sheet 2

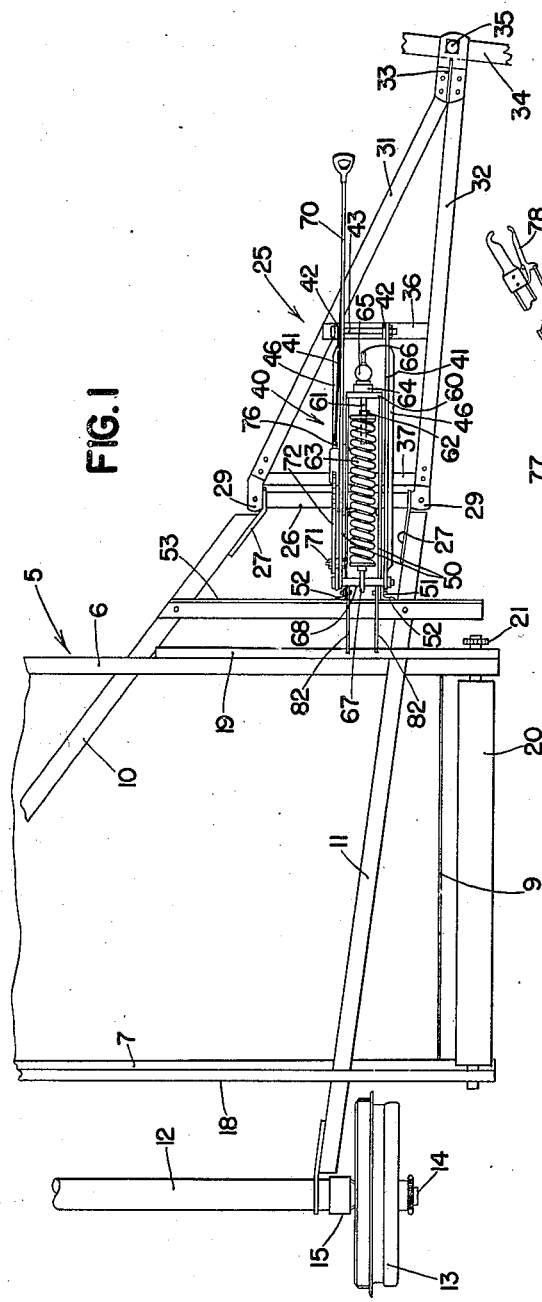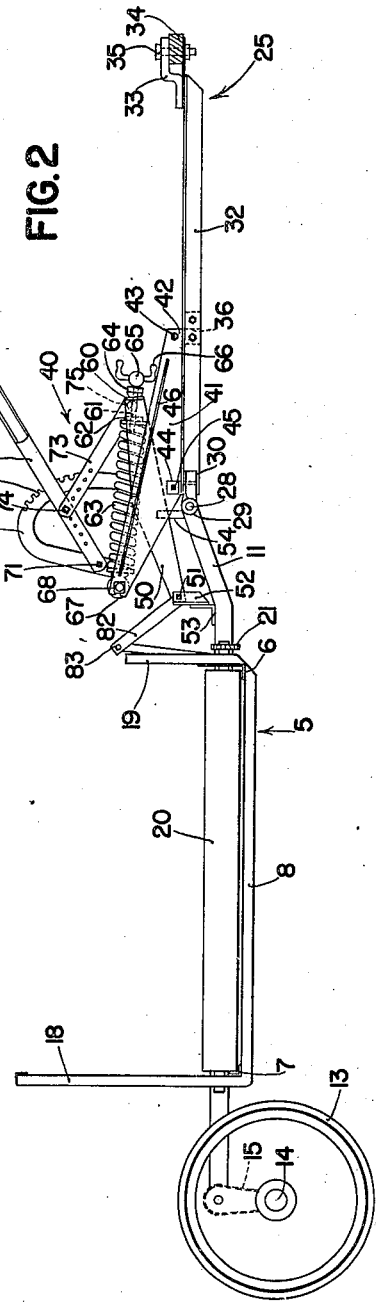
INVENTORS
ALVIN W. OEHLER
DONALD L. ADAMS
ATTORNEYS

INVENTORS
ALVIN W. OEHLER
DONALD L. ADAMS
BY
ATTORNEYS

Patented June 5, 1945

2,377,806

UNITED STATES PATENT OFFICE 2,377,806

HITCH DEVICE

Alvin W. Oehler and Donald L. Adams, Moline, Ill., assignors to Deere & Company, Moline, Ill., a corporation of Illinois Application December 8, 1943, Serial No. 513,646

10 Claims. (Cl. 280—33.44)

The present invention relates generally to hitch devices and is particularly applicable to farm implements or vehicles of the type which is supported at one end on ground engaging wheels, the other end being carried on a tractor or other draft device. The principal object of the present invention relates to the provision of a novel and improved counterbalancing and adjusting mechanism for angularly adjusting foldable hitch devices to raise or lower the adjacent end of the vehicle or implement frame relative to the ground. A further object relates to the provision of a hitch device which can be readily folded upwardly to transport position. This invention is in the nature of an improvement over a hitch device disclosed and claimed in the co-pending application, Serial No. 360,030, filed October 7, 1940, by Oehler, Adams, and Harter, and issued August 1, 1944, as Patent 2,354,962.

These and other objects and advantages of my invention will be apparent to those skilled in the art after a consideration of the following description, in which reference is had to the drawings appended hereto, in which Figure 1 is a fragmentary plan view of a harvester equipped with a hitch device embodying the principles of the present invention.

Figure 2 is a side elevational view of the same.

Figure 4:
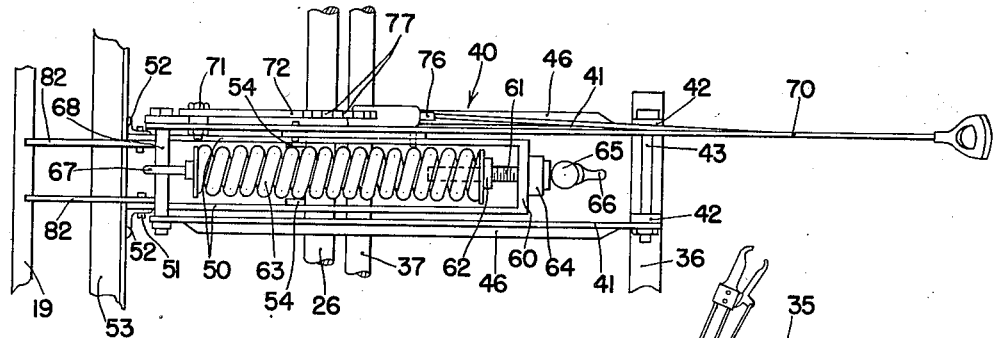
Figure 4 is a fragmentary plan view showing the counterbalancing mechanism drawn to a larger scale.

Referring now to the drawings, the harvester frame is indicated generally by reference numeral 5 and comprises a pair of front and rear transverse frame members 6, 7 interconnected by fore and aft extending frame members 8, and supporting therebetween an imperforate floor plate 9. A pair of forwardly converging frame members 10, 11 extend over the floor plate 9 and project forwardly beyond the forward frame member 6 and also project behind the rear frame member 7. The rear ends of the converging members 10, 11 are connected to a transverse tubular beam 12 disposed in spaced relation behind the frame of the harvester. Each end of the tubular member 12 is supported on a ground engaging wheel 13, which is journaled on an axle 14 which is carried at the lower end of a depending supporting arm 15 at the end of the transverse tubular member 12. The harvester is provided with a back wall 18 extending upwardly from the rear transverse member 7 and a low front wall 19 extending from the end of the platform frame to the inner member 10 of the pair of converging draft members. A platform roller 20 extends fore and aft between the two transverse frame members 6, 7 and is journaled in the latter at opposite ends thereof, respectively. The roller is driven through a suitable sprocket 21, mounted on the forward end of the shaft, by suitable drive mechanism (not shown). Further details of the harvester and its operating mechanism are not considered necessary for the present disclosure, since the invention relates only to the hitch device, indicated generally by reference numeral 25, although further details may be obtained from the above-identified co-pending application, as to the remainder of the harvester.

The forward ends of the converging members 10, 11 are interconnected by means of a tubular frame member 26, which is rigidly fixed, as by welding, to a pair of strap members 27 at opposite ends thereof, which strap members are rigidly secured to the forward ends of the converging frame members 10, 11, respectively. A shaft 28 extends through the tubular member 26 and projects laterally from both ends thereof to receive a pair of hubs 29 mounted on brackets 30, which are rigidly fixed to the rear ends of a pair of forwardly converging members 31, 32. The forward ends of the members 31, 32 are rigidly connected to a clevis 33 which serves as a coupler to couple the implement frame 5 to a draft device such as a tractor, represented by a section of drawbar 34. The coupler 33 is pivotally connected to the drawbar 34 by means of a vertical pivot bolt 35. The converging members 31, 32 are interconnected by suitable braces 36, 37 intermediate the ends of the members 31, 32, to form a rigid draft frame which is vertically swingable about the axis of the shaft 28 relative to the harvester frame 5.

The rear end of the frame 5 is supported on the ground wheels 13, while the forward end of the frame 5 is supported on the tractor drawbar 34 through the hitch device 25. The angle between the draft frame and the implement frame is adjustably determined by means of a counterbalancing and adjusting mechanism indicated by reference numeral 40, which will now be described in detail. A pair of arms in the form of triangular plates 41 are disposed in parallel arrangement, laterally spaced, and rigidly mounted on the forward draft frame by means of a pair of vertical lugs 42, rigidly connected to and extending above the forward brace 36. The forward ends of the plates 41 are connected to the lugs 42 by means of a transverse through bolt 43. The intermediate portions of the plates or arms 41 are connected to lugs 44 which are rigidly fixed to the rear brace 37 interconnecting the draft frame members 31, 32 by means of a through bolt 45, which is readily removable for conditioning the hitch device for transport purposes as will be made apparent later. The two arms 41 extend upwardly and rearwardly across the axis of the shaft 28 and above the implement frame. The plates 41 are strengthened by ribs 46, which are welded thereto and extend longitudinally thereof.

A second pair of arms in the form of generally triangular plates 50 are mounted on the implement frame 5 and extend forwardly across and above the axis of the pivot shaft 28 and over the draft frame. The plates 50 are disposed in laterally spaced relation between the plates 41 and overlap the latter in crossed arrangement. The rear ends of the arms 50 are bolted at 51 to a pair of vertical brackets 52 rigidly fixed in laterally spaced relation on a transverse structural bracing member 53, the latter being fixed to the two converging members 10, 11 at opposite ends thereof, respectively. The intermediate portions of the plates 50 are welded to supports 54 which extend downwardly therefrom and are rigidly fixed to the transverse tubular member 26. Thus, during operation, the two pairs of arms 41, 50 are rigidly mounted on the draft and implement frames, respectively, and extend across and above the axis of the pivot shaft 28 in overlapping crossed relation.

The forward ends of the forwardly extending arms 50 are interconnected by a transverse bar 60, which is apertured to receive a threaded rod 61, which engages a nut 62 fixed to the end of a tension spring 63. The rod 61 is journaled in a bearing member 64 on the forward side of the bar 60, against which bears a spherical thrust member 65 attached to the end of the rod 61. The threaded rod 61 is rotated by means of a handle 66 fixed to the thrust member 65, for adjusting the nut 62 in the end of the spring 63 fore and aft to increase or decrease the tension in the spring 63.

The rear end of the spring 63 is fixed to an eyebolt 67, which is connected by means of a through bolt 68 to the rear ends of the rearwardly extending arms 41. The bolt 68 is supported in a pair of slots 69 which open rearwardly to permit the bolt 68 to be slipped into supported position on the arms 41 without the necessity of removing the bolt 68 from the eyebolt 67 in the end of the spring 63. Thus, with the threaded rod 61 retracted from the nut 62 to provide sufficient length, the bolt 68 can be slipped into the slots 69, after which the rod 61 can be turned by means of the handle 66 to draw the nut 62 forwardly and thus tensioning the spring 63 between the ends of the arms 41 and 50. The force of the tension spring 63 acting between the arms 41, 50, exerts a lifting force on the hitch device tending to raise the axis of the shaft 28 when the forward end of the hitch device is supported on the tractor drawbar 34 and the rear end of the frame is carried on the wheels 13.

In order to adjustably fix the angle between the draft and implement frames relative to the axis of the shaft 28, an adjusting lever 70 is pivotally mounted on a bolt 71, which is supported in a sector member 72, the latter being fixed as by welding to one of the arms 41. The lever 70 is pivotally connected to a link 73 by means of a bolt 74, the opposite end of the link being pivotally connected at 75 to the forward end of the adjacent arm 50. By raising the lever 70, which extends forwardly to a convenient position near the operator's station on the tractor, the ends of the arms 41, 50 are drawn toward each other, thereby tending to raise the forward end of the frame 5. This raising action is, of course, aided by the tension of the spring 63. By swinging the lever 70 downwardly about the pivot bolt 71, the ends of the arms 41, 50 are forced apart against the tension of the spring 63, thereby lowering the pivot axis of the shaft 28 between the draft and implement frames, thereby lowering the forward end of the harvester frame. A conventional latch mechanism 76 mounted on the lever engages a series of notches 77 in the sector 72, under control of a latch lever 78 mounted at the forward end of the lever 70. The purpose of adjusting the height of the forward end of the implement frame is to adjust the crop gathering device such as a sickle (not shown), as is well-known to those skilled in the art.

Figure 3:
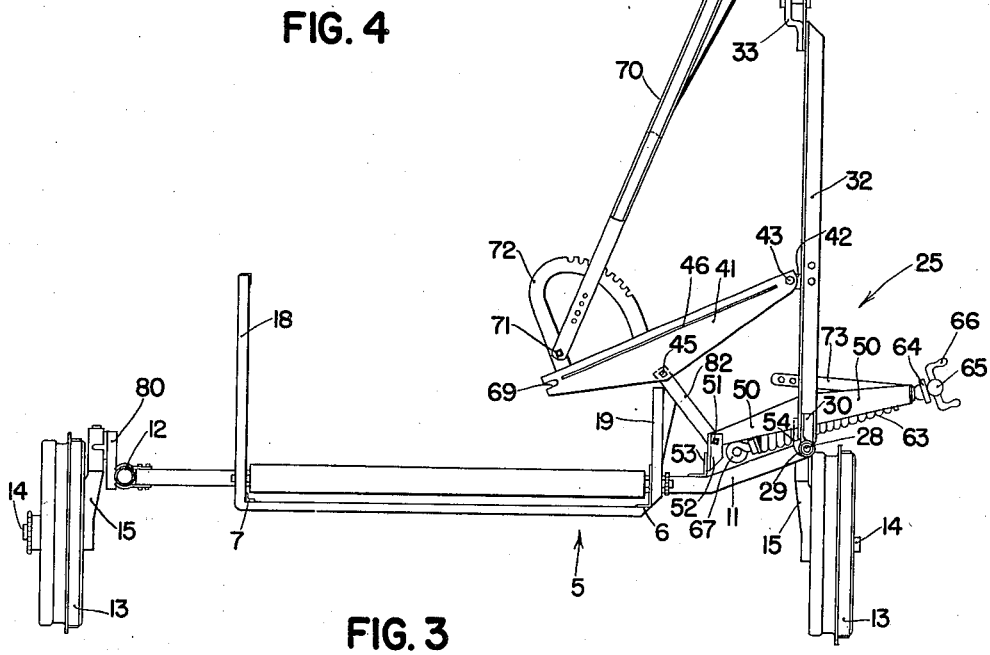
Figure 3 is a side elevational view of the harvester with the hitch device folded upwardly in transport position and with the wheels connected to the frame for endwise transport.

In the case of long harvester platforms, such as windrow harvesters and the like, it is desirable to transport them from one field to another in an endwise position, since the width is too great in normal operating position to permit them to be drawn through gates and along roads. For this purpose, as indicated in Figure 3, the wheels 13 are removed from the ends of the transverse tubular member 12 and are supported on suitable brackets 80 on the front and rear tubular members 26, 12, respectively, for rotation about axes which are generally perpendicular thereto. At the same time, it is necessary to move the hitch device 25 upwardly to reduce the width of the harvester when moving endwise in transport. This is accomplished by first relieving the tension of the spring 63 by turning the handle 66, after which the bolt 68 can be lifted out of the slots 69 and the spring 63 can be laid across the bracing member 37 between the two pairs of laterally spaced arms 41, 50. The link 73 is then disconnected from the lever 70 by removing the bolt 74 and the bolt 45 is also removed to permit the arms 41 to be swung about the axis of the through bolt 43, as the forwardly converging members 31, 32 are swung upwardly about the axis of the shaft 28 to a vertical position as shown in Figure 3, the arms 41 and lever mechanism 70 being disposed in extended position over the front wall 19 of the harvester frame. The arms 41 are supported on a pair of brackets 82 by inserting the bolt 45 through apertures 83 in the upper ends of the brackets 82. This secures the draft members 31, 32 in vertical position and also prevents the arms 41 and lever 70 from shifting during transport. The brackets 82 are supported at their forward ends on the bolts 51 and at their rear ends on the front wall 19.

It will be evident to those skilled in the art that the hitch device with its counterbalancing and adjusting mechanism is simple and compact but is strong and durable. It is also easily adjusted during operation in the field, for there is very little friction between the parts and the tension spring 63 can be adjusted to counterbalance any desired portion of the load. Furthermore, the hitch device can be quickly and easily conditioned for transport purposes, and during transport it is securely held in the desired position.

We do not intend our invention to be limited to the exact details shown and described herein, except as set forth in the claims which follow.

We claim:

1. For use with a vehicle frame supported at one end on a ground engaging wheel, the combination of a draft member pivotally mounted on the other end of said vehicle for supporting the same and swingable vertically relative thereto about a transverse axis, a pair of bracket arms fixed to said vehicle and said draft member and extending longitudinally in overlapping arrangement to terminal points on opposite sides of said axis, respectively, counterbalancing spring means interconnecting said terminal points and biased to exert a force between said points tending to raise the pivot axis, and lifting means adjustably connecting said arms to control the height of said pivot axis.

2. For use with a vehicle frame supported at one end on a ground engaging wheel, the combination of a draft member pivotally mounted on the other end of said vehicle for supporting the same and swingable vertically relative thereto about a transverse axis, a pair of bracket arms fixed to said vehicle and said draft member and extending longitudinally in overlapping relation above said axis, and a tension spring element extending longitudinally across said pivot axis and interconnecting said arms, urging the same together to support said axis.

3. For use with a vehicle frame supported at one end on a ground engaging wheel, the combination of a draft member pivotally mounted on the other end of said vehicle for supporting the same and swingable vertically relative thereto about a transverse axis, an arm fixed to said vehicle and extending across said axis and over said draft member, a second arm fixed to said draft member and extending cross said axis and over said vehicle frame, and resilient means extending across and above said pivot axis and interconnecting said arms, said resilient means tending to draw the latter together to support said vehicle.

4. For use with a vehicle frame supported at one end on a ground engaging wheel, the combination of a draft member pivotally mounted on the other end of said vehicle for supporting the same and swingable vertically relative thereto about a transverse axis, a pair of laterally spaced arms fixed to said vehicle frame and extending across said axis and over said draft member, a second pair of laterally spaced arms fixed to said draft member and extending across said axis and over said vehicle frame, one of said pairs of arms being disposed between the other pair of arms, a transverse member interconnecting the adjacent ends of each pair of arms, and a tension spring stretched between and connected to said transverse members.

5. A hitch device comprising a pair of frames pivotally connected together for relative vertical movement about a transverse axis, a pair of arms fixed to said frames, respectively, and extending longitudinally in crossed relation above and across said transverse axis, a tension spring stretched between and connected to the ends of said arms, an adjusting lever pivotally mounted on one of said arms, and link means connecting said lever with the other of said arms for raising and lowering said pivot axis.

6. A hitch device comprising a pair of frames pivotally connected together for relative vertical movement about a transverse axis, a pair of arms fixed to said frames, respectively, and extending longitudinally in crossed relation above and across said transverse axis, a second pair of arms fixed to said frames, respectively, and extending longitudinally in crossed relation, said second pair of arms being substantially parallel to the first pair of arms and spaced laterally therefrom, a tension spring extending longitudinally between said two pairs of arms, a pair of transverse connecting means for connecting the adjacent ends of the parallel arms, respectively, and means connecting each end of said spring to one of said transverse connecting means.

7. A hitch device comprising a pair of frames pivotally connected together for relative vertical movement about a transverse axis, a pair of arms fixed to said frames, respectively, and extending longitudinally in crossed relation above and across said transverse axis, a second pair of arms fixed to said frames, respectively, and extending longitudinally in crossed relation, said second pair of arms being substantially parallel to the first pair of arms and spaced laterally therefrom, a tension spring extending longitudinally between said two pairs of arms, a pair of transverse connecting means for connecting the adjacent ends of the parallel arms, respectively, means connecting each end of said spring to one of said transverse connecting means, a lever mounted on one of said arms, link means connecting said lever with the associated crossed arm, and means for fixing said lever in adjusted position.

8. The combination set forth in claim 7, further characterized in that said spring and said link are readily disconnectible at one end to provide for swinging one of said frames upwardly to a substantially vertical transport position while said arms remain mounted on their respective frames.

9. A hitch device comprising a pair of frames pivotally connected together for relative vertical folding movement about a transverse axis, a pair of arms associated with said frames, respectively, and extending longitudinally in crossed relation across said transverse axis, means for rigidly mounting said arms on said frames, respectively, said mounting means including a pair of longitudinally spaced securing members for one of said arms, one of said members being removable and the other of said members providing for pivotal movement of said one arm relative to its associated frame after removal of said one member to permit folding said frames about their pivot connection, means for securing said one arm to the opposite frame to hold said frames in folded position, and a detachable counterbalancing spring connected between the ends of said arms and biased to exert a force therebetween tending to raise the pivot connection between said frames in operating position.

10. A hitch device comprising a pair of frames pivotally connected together for vertical folding movement about a transverse axis between operating and transport positions, an arm fixed to one of said frames and extending longitudinally across said pivot axis overlapping the other frame, a second arm pivotally mounted on said other frame and extending longitudinally across said axis overlapping the first mentioned arm, means for selectively securing said second arm to said other frame at a point spaced longitudinally from said pivot mounting with said frames disposed in operating position, or to said one frame when said frames are folded to transport position, and a counterbalancing spring detachably connected between the ends of said arms when said frames are in operating position.

ALVIN W. OEHLER.
DONALD L. ADAMS.